United States Patent [19]
Yoshio et al.

[11] Patent Number: 5,235,584
[45] Date of Patent: Aug. 10, 1993

[54] APPARATUS FOR DETECTING A POSITION OF A LIGHT SPOT ON AN OPTICAL DISC

[75] Inventors: Junichi Yoshio; Sinichi Nagahara, both of Yokorozawa, Japan

[73] Assignee: Pioneer Electronic Corporation, Tokyo, Japan

[21] Appl. No.: 779,013

[22] Filed: Oct. 18, 1991

[30] Foreign Application Priority Data

Oct. 19, 1990 [JP] Japan .................. 2-283153

[51] Int. Cl.$^5$ .................................. G11B 7/095
[52] U.S. Cl. .................. 369/44.29; 369/44.34; 369/44.37; 369/44.41
[58] Field of Search .............. 369/44.26, 44.28–44.34, 369/44.37–44.38, 44.41–44.42, 44.35

[56] References Cited
U.S. PATENT DOCUMENTS
5,148,424 9/1992 Wachi .................. 369/44.41

Primary Examiner—W. R. Young
Attorney, Agent, or Firm—Kane, Dalsimer, Sullivan, Kurucz, Levy, Eisele and Richard

[57] ABSTRACT

An apparatus detects a position of a light spot necessary for the tracking control and the track jumping control at the time of reproducing an optical disk. Three light beams are used to provide three push-pull outputs from the respective light beams, thus making it possible to discriminate whether or not the light spot is in the on-track state on the basis of a value obtained as the result of a predetermined calculation of the respective push-pull outputs. In this apparatus, there is employed an arrangement such that in the case where the central light spot of the three light spots exists on the axis of one recording track, other two preceding and succeeding light spots are not projected onto the adjacent tracks.

5 Claims, 14 Drawing Sheets

LIGHT INTENSITY AT PHOTODITECTOR

LIGHT INTENSITY AT PHOTODITECTOR

F I G. 12
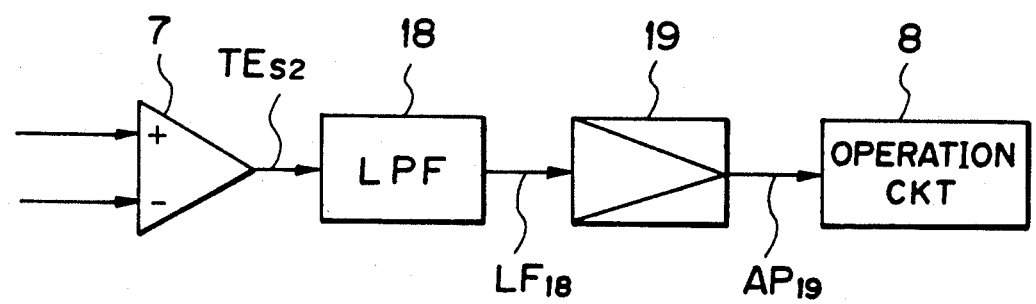

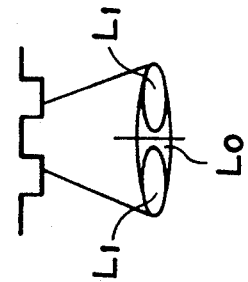
FIG.15(A) PRIOR ART
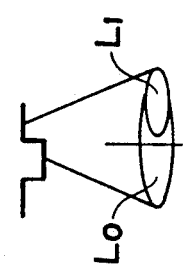
FIG.15(B) PRIOR ART
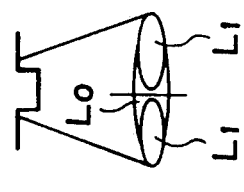
FIG.15(C) PRIOR ART
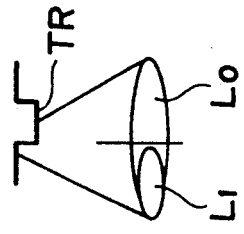
FIG.15(D) PRIOR ART
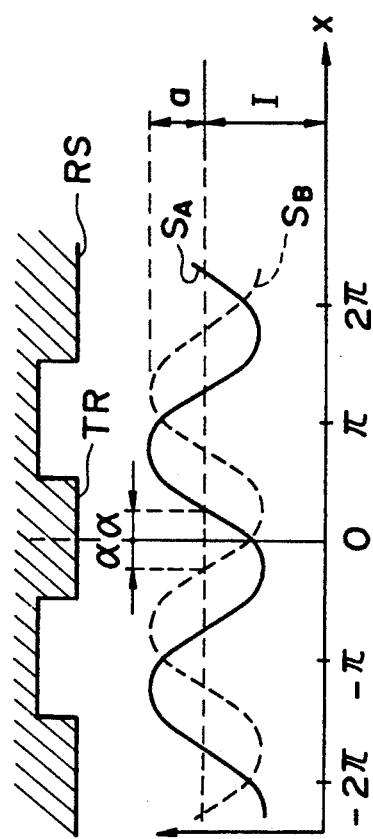
FIG.16(A) PRIOR ART
FIG.16(B)

APPARATUS FOR DETECTING A POSITION OF A LIGHT SPOT ON AN OPTICAL DISC

BACKGROUND OF THE INVENTION

The present invention relates to an apparatus for detecting a position of a light spot in an optical disk, and more particularly to an apparatus for detecting a position of a light spot suitable for a tracking servo control or a track-jumping operation control of an optical memory disk (hereinafter referred to as an OMD).

Hitherto, in the tracking control of an optical disk exclusive for reproduction such as a compact disk, detection as to whether or not a light spot for reading information exists on the axis of the recording track of the optical disk (hereinafter referred to as on-track detection) is conducted generally by using the method called the 3-light-beam method or the push-pull method.

The principle of the 3-light-beam method is as follows. Namely, a preceding light spot and a succeeding light spot are irradiated at the positions preceding and succeeding to a light spot of a main light beam for recording and reading information with the same predetermined spacings in direction of the center line of the recording track and with another predetermined spacings in a direction perpendicular to the center line direction of recording tracks (travelling direction of the light beam) with respect to the light spot of the main light beam, respectively. In this case, the preceding light spot and the succeeding light spot are such that the same spacings are provided in directions opposite to each other with respect to the center line of the recording track in a manner that it is put therebetween. Among rays of reflected light from these light spots, a reflected light beam from the preceding light spot is detected by a first photodetector, a reflected light beam from the succeeding light spot is detected by a second photodetector, and a light spot from the main light beam is detected by a third photodetector. Then, an electric output $S_{s1}$ from the first photodetector and an electric output $S_{s2}$ from the second photodetector which have been subjected to photoelectric conversion are inputted to the subtraction circuit to perform the following calculation:

$$TE_a = S_{s1} - S_{s2}.$$

Thus, a differential output TEa is provided. At this time, if the center of the main light beam exists on the axis of the recording track, the following relationship holds:

$$S_{s1} = S_{s2}$$

Namely, $$TE_a = 0.$$

In contrast, if the center of the main beam deviates from the center line of the recording track, the difference output $TE_a$ becomes a positive or negative value which is not equal to zero. Accordingly, when a control is conducted so that the value of the difference output $TE_a$ is equal to zero, the tracking servo control can be carried out. Further, counting the points at which the value of $TE_a$ is crossing the zero point (hereinafter reffered to as zero cross points) is equivalent to counting the number of recording tracks. By carrying out this, the positional control of a light spot in the track jumping operation to move over many tracks in a radial direction of the disk can be conducted. Generally, this difference output $TE_a$ is called a tracking error signal. In this case, the output $TE_a$ may have the relationship expressed as $TEa = S_{s2} - S_{s1}$.

However, it should be noted that the above mentioned on-track detection can be carried out by the 3-light-beam method only in connection with an optical disk exclusive for reproduction. In such an optical disk exclusive for reproduction, there is a small quantity of reflected light at the portion of the recording track because pit trains where information signals are stored are recorded, whereas there is a great quantity of reflected light at the portions except for the recording track because they are subjected to mirror finish. Accordingly, values of $TE_a$ which are not equal to zero are provided.

However, in the case of OMD of the Write Once Read Many (WORM) type or the Erasable Direct Read After Write (E-DRAW) type, at the non-recorded portion where no information is recorded, there is hardly difference between a quantity of reflected light at the portion of the track on which information is to be recorded (which particularly called a groove in the case of the OMD) and that at the portions except for the above. Accordingly, even if an attempt is made to provide a tracking error signal by the above-mentioned calculation, the value of $TE_a$ becomes equal to substantially zero. Thus, both in the on-track state where the center of the reading light spot exists on the center line of the recording track and in the off-track state where the center of the reading light spot deviates from the center line of the recording track, the value of $TE_a$ becomes equal to zero. As a result, the on-track detection cannot be carried out.

Even in such a case, the push-pull method is known as the method permitting the on-track detection. In the push-pull method, a bisected or half-split photodetector is used. By unevenness due to the recording tracks (grooves) on the recording surface of the optical disk and the groove portions except for the above, the zero-th order reflected light and ±1-st order reflected light are produced. When these rays of the reflected light are emitted onto the photodetector, the portion having a relatively high light intensity and the portion having a relatively low light intensity are produced. In this case, when an output from one detector surface of the bisected detector surfaces is $S_A$ and an output from the other detector surface is $S_B$, if a light spot exists on the center line of the recording track (groove), the difference output $TE_b = (S_B - S_A)$ becomes equal to zero. Thus, this method can be used for the on-track detection.

However, even in the case where this push-pull method is used, when the disk is inclined in a radial direction thereof or the optical axis of the lens of the optical system deviates to any degree, an offset is produced. When such an offset is produced, even if the light spot exists on the center line of the recording track (groove), the difference output $TE_b$ does not equal to zero.

As the example of the on-track detection method attempting to solve the above-mentioned offset, the method called 3-push-pull method is known.

This system uses three light beam spots in the same manner as in the case of the 3-light-beam method. In this case, the preceding light spot and the succeeding light spot are both emitted also onto recording tracks $TR_{i+1}$ and $TR_{i-1}$ adjacent to the both sides of the recording track $TR_i$ on which the main light spot exists. Namely, a portion of a light at the outer periphery of the preceding light spot is emitted also onto the recording track $TR_{i+1}$. Also in the case of the succeeding light spot, a portion of a light at the outer periphery thereof is also on the recording track $TR_{i-1}$. Reflected light beams from the respective light spots are detected by the three half-split photodetectors. Then, respective difference outputs are calculated on the basis of the push-pull method. When the push-pull difference of the main light spot is $TE_M$, the push-pull difference output of the preceding light spot is $TE_{s1}$, and the push-pull difference output of the succeeding light spot is $TE_{s2}$, calculation expressed below is performed:

$$TE_d = TE_M - (K_o/2) \times (TE_{s1} + TE_{s2}).$$

Thus, an output $TE_d$ can be provided. In the above equation, $K_o$ represents real number of a ratio between a push-pull difference output from the main light spot and a push-pull difference output from the preceding or succeeding light spot in the on-track state. In the on-track state, $K_o = TE_M/TE_{s1} = TE_M/TE_{s2}$. In the case where the center of the main light spot exists on the center line of the recording track, the output $TE_d$ becomes equal to zero. Accordingly, the tracking control can be carried out also at the non-recorded track portion without undergoing the influence of an offset.

However, there was a problem that in the case of the so called track jumping operation such as an operation to search a desired music piece at a high speed in compact disks, etc., the on-track detection cannot be carried out by the 3-push-pull method. The reason therefor is as follows. In the case of the search operation, the number of zero-cross points is counted to retrieve a target track, but discrimination between the on-track position and the off-track position could not be made only by information about the zero-cross points.

Further, with the conventional 3-push-pull method, also in the tracking control at the time of writing (recording) information onto OMD, etc., there was the problem.

Namely, at the time of writing information, pits are formed by the main light spot, but a quantity of reflected light from the light spot on the pits is small. Accordingly, when a portion of the succeeding light beam is positioned on the pits, the output of the photodetector is lowered. From this fact, even if the main light spot exists on the center line of the tracks (grooves), the tracking error signal $TE_d$ dose not seemingly becomes equal to zero. Thus, judgment might be erroneously made as if deviation were produced in the tracking.

SUMMARY OF THE INVENTION

The present invention has been made for the purpose of an improvement on the 3-push-pull method in the conventional form, and its object is to provide an apparatus for detecting a position of a light spot in which the improved 3-push-pull method is used to permit the on-track detection without hindrance even at the no information recorded portion of an optical disk, and to permit the on-track detection without hindrance even at the time of recording information onto an optical disk.

In accordance with one aspect of the present invention, there is provided an apparatus for detecting a position of a light spot in which a reflected light beam from a signal recording surface of an optical disk is used to detect whether or not the light spot exists on the center line of a recording track of the optical disk, the apparatus comprising:

a light emitting unit for emitting, onto the signal recording surface, a first light spot, a second light spot located at a position preceding to the first light spot with a first predetermined spacing in a direction of the center line of the recording track and with a second predetermined spacing from adjacent tracks in a direction perpendicular to the center line of the recording track so that no light beam is emitted thereonto, and a third light spot located at a position succeeding to the first light spot with the same spacing as the first predetermined spacing in a direction of the center line of recording track and with the same spacing as the second predetermined spacing on the opposite to the second light spot in a direction perpendicular to the center line of the recording track;

a first photodetection unit including bisected detector surfaces, and for applying photoelectric conversion to a reflected light beam from the first light spot to output two electric signals;

a second photodetection unit including bisected detector surfaces, and for applying photoelectric conversion to a reflected light beam from the second light spot to output two electric signals;

a third photodetection unit including bisected detector surfaces, and for applying photoelectric conversion to a reflected light beam from the third light spot to output two electric signals; and an operation unit for calculating a first difference output indicative of a difference between the two electric signals from respective detector surfaces of the first photodetection unit, a second difference output indicative of a difference between the two electric signal from respective detector surfaces of the second photodetector, and a third difference output indicative of a difference between the two electric signals from respective detector surfaces of the third photodetection unit, said operation means calculating a sum of the second and the third difference outputs, calculating a product of the sum and a predetermined real number, calculating a difference between the product and the first difference output to output a first light spot position signal, and calculating a difference between the second and the third difference outputs to output a second light spot position signal.

In this case, the second predetermined spacing may be substantially one fourth of the distance between axes of the adjacent recording tracks.

In accordance with one aspect of the present invention thus constructed, the second light spot is emitted at a position such that no light beam is emitted onto recording tracks adjacent in a direction perpendicular to the center line of the recording track, and the third light spot is emitted with the same spacing as in the case of the second light spot on the opposite side to the second light spot with respect to the recording track. Thus, there is produced a phase difference between the difference output (push-pull output) $TE_{s1}$ of the second light spot and the difference output (push-pull output) $TE_{s2}$ of the third light spot. For this reason, if the first light spot position signal $TE_1$ is calculated by the following equation:

$$TE_1 = TE_M - (K/2) \times (TE_{s1} + TE_{s2}).$$

(In the above equation, $TE_M$ represents a first difference output, and $K/2$ represents a predetermined real number), and the second light spot position signal $TE_2$ is calculated by the following equation:

$$TE_2 = TE_{s1} - TE_{s2}$$

it can be discriminated that only when $TE_1$ is equal to zero and $TE_2$ takes a predetermined value, there results the on-track state. Since there dose not result the on-track state when $TE_2$ takes other values even if $TE_1$ is equal to zero, discrimination is easily carried out. Whereas, in the case of the conventional 3-push-pull method, since the phases of $TE_{s1}$ and $TE_{s2}$ are equal to each other, $TE_2$ is equal to zero at all times. Accordingly, the on-track state could not be detected only by the fact of zero cross that $TE_1$ is equal to zero. On the contrary, in accordance with the above form of one aspect of this invention, discrimination can be easily conducted. Here, the value of K represents a ratio between a push-pull difference output from the main light spot and a means value of push-pull outputs from the preceding and succeeding light spots in the on-track state.

If the above mentioned second predetermined spacing is set to substantially one fourth of the distance between axes of the adjacent recording tracks, it is indicated that when $TE_1$ is equal to zero and $TE_2$ takes a negative maximal value, there results the on-track state.

In accordance with another aspect of the present invention, there is provided an apparatus for detecting a position of a light spot in which a reflected light beam from a signal recording surface of an optical disk is used to detect whether or not the light spot exists on a center line of the recording track of the optical disk, the apparatus comprising:

a light emitting unit for emitting, onto the signal recording surface, a first light spot, a second light spot located at a position preceding to the first light spot with a first predetermined spacing in a direction of the center line of the recording track and with a second predetermined spacing from adjacent tracks in a direction perpendicular to the center line of the recording track, and a third light spot located at a position succeeding to the first light spot with the first predetermined spacing in a direction of the center line of the recording track and with the second predetermined spacing on the opposite side to the second light spot in a direction perpendicular to the center line of the recording track;

a first photodetection unit including bisected detector surfaces, and for applying photoelectric conversion to a reflected light beam from the first light spot to output two electric signals;

a second photodetection unit including bisected detected surfaces, and for applying photoelectric conversion to a reflected light beam from the second light spot to output two electric signals;

a third photodetection unit including bisected detector surfaces, and for applying photoelectric conversion to a reflected light beam from the third light spot to output two electric signals; and an operation unit for calculating a first difference output indicative of a difference between the two electric signals from the respective detector surfaces of the first photodetection unit, a second difference output indicative of a difference between the two electric signals from the respective detector surfaces of the second photodetection unit, and a third difference output indicative of a difference between the two electric signals from the respective detector surfaces of the third photodetection unit to generate, from the third difference output, a fourth difference output including no radio frequency signal component, the operation unit calculating a sum of the second and fourth difference outputs, calculating a product of the sum and a predetermined real number, calculating a difference between the product and the first difference output to output a first light spot position signal, and calculating a difference between the second and the fourth difference outputs to output a second light spot position signal.

In this case, the operation unit may be constructed as follows. Namely, in the case where the first light spot position signal on the recording track is placed in the non-recording state, after the time required until the light spot moves by a distance between the center of the first light spot and that of the third light spot has passed from the above time point when the position of the first light spot is placed in the non-recording state, the operation unit samples and holds the third difference output to generate the fourth difference output, thus to calculate the first and the second light spot position signals.

Further, the operation unit may hold a peak level of the third difference output to generate the fourth difference output, thus to calculate the first and the second light spot position signals.

Alternatively, the operation unit may amplify the low frequency band component of the third difference output at a predetermined amplification factor to generate the fourth difference output, thus to calculate the first and the second light spot position signals.

In accordance with another aspect of the present invention thus constructed, even in the case of the light spot position detector using the 3-push-pull method in the conventional form, or the light spot position detector according to one aspect of the present invention, since an approach is employed to generate, from the third difference output $TE_{s2}$, a fourth difference output including no radio frequency component changing the light output of the succeeding third light spot at the time of recording information onto OMD to perform a calculation similar to the above by using the fourth difference output thus generated in place of $TE_{s2}$, thus making it possible to calculate the first and the second light spot position signals $TE_1$ and $TE_2$ without hindrance.

In this case, the operation unit may be of a structure to sample and hold the third difference output $TE_{s2}$, after the time $\tau$ ($=l/v$) has passed from the time point when the position of the first light spot is placed in a non-recorded state, to use it as the fourth difference output in place of $TE_{s2}$, thus to calculate the first and the second light spot positions. In the above equation of $\tau$, $l$ is a distance between the center of the first light spot and that of the third light spot, and v is a speed of a light spot moving on the recording track. By carrying the operation unit in this way, since there is produced no change in the push-pull output $TE_{s2}$ of the succeeding third light spot also at the time of recording information onto OMD, it is possible to calculate the first and the second light spot position signals $TE_1$ and $TE_2$.

Further, in this case, an approach may be employed to peak-hold the third difference output $TE_{s2}$ to thereby correct a photoelectric output changed by a difference between a quantity of a reflected light at the non-recorded portion and that at the recorded portion, thus making it possible to use it as the fourth difference output. Also in this case, at the time of recording information onto OMD, the operation unit can calculate the first and the second light spot position signals $TE_1$ and $TE_2$ without hindrance.

Furthermore, an approach may be employed to extract the low frequency band component of the third difference output, thereby making it possible to provide a mean value of photoelectric outputs changed due to the radio frequency. Although the level of this mean value is lowered to some extent as compared to the third difference output which does not undergo changes due to the radio frequency, if that mean value is amplified at a predetermined amplification factor, the operation unit can calculate the first and the second light spot position signals $TE_1$ and $TE_2$ without hindrance.

It is to be noted that, in another aspect of the present invention, an approach may be employed to take a sum output of the two electric signals from the respective detector surfaces of the second photo detection unit to obtain a second sum output, to take a sum output of the two electric signals from the respective detector surfaces of the the third photodetection unit to obtain a third sum output, and to take a difference between the second and third sum outputs, thereby making it possible to easily use this apparatus as an apparatus for detecting a light spot position based on the ordinary 3-light-beam method.

BRIEF DESCRIPTION OF THE DRAWINGS

FIG. 12 is a block diagram showing the configuration of a fifth embodiment according to the present invention, FIGS. 13(A-B) is a view showing the principle of the 3 light beam method, FIGS. 14, 15(A-D), 16(A-B) and 17(A-C) are views showing the principle of the push-pull method, FIGS. 18 and 19(A-B) are views for explaining an offset in the push-pull method, FIGS. 20 and 21(A-E) are views for explaining the conventional 3-push-pull method, and FIGS. 22(A-B) is a view for explaining the tracking control at the time of writing information.

DETAILED DESCRIPTION OF THE PREFERRED EMBODIMENTS

Prior to the description of the preferred embodiments of the present invention, the principle of the 3-light-beam method and the problems therewith, the principle of the push-pull method and the problems therewith, and the principle of the 3-push-pull method and the problems therewith will be first described with reference to the attached drawings.

3-LIGHT-BEAM METHOD

Figure 13A:
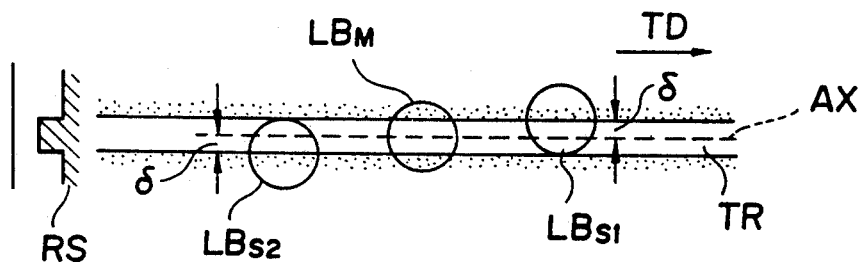
Figure 13B:
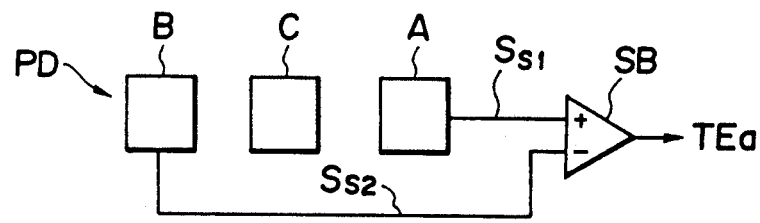

The principle of the 3-light-beam method is shown in FIG. 13. As shown in FIG. 13(A), a preceding light spot $LB_{s1}$ and a succeeding light spot $LB_{s2}$ are irradiated at positions preceding and succeeding to a light spot $LB_M$ of a main light beam for recording and reading information with the same predetermined spacings in a direction of a recording track center line AX, and with another spacing $\delta$ in a direction perpendicular to the center line direction TD (travelling direction of the light beam) of the recording track TR. In this case, the preceding light spot $LB_{s1}$ and the succeeding light spot $LB_{s2}$ are such that spacings $\delta$ are provided in directions opposite to each other with respect to the center line of the recording track TR. Among rays of reflected light from these light spots, as shown in FIG. 13(B), a reflected light beam from the preceding light spot $LB_{s1}$ is detected by a first photodetector A, a reflected light beam from the succeeding light spot $LB_{s2}$ is detected by a second photodetector B, and a light spot $LB_M$ of a main light beam is detected by a third photodetector C. Then, an electric output $S_{s1}$ from the detector surface A and an electric output $S_{s2}$ from the detector surface B which have been subjected to photoelectric conversion at the respective detector surfaces are inputted to a subtraction circuit SB. When the calculation expressed below is performed, $$TE_a = S_{s1} - S_{s2} \tag{1}$$

an output $TE_a$ is provided. If the center of the main light beam $LB_M$ exists on the center line AX of the recording track TR, the following relationship holds:

$$S_{s1} = S_{s2} \tag{2}$$

Namely, $$TE_a = 0 \tag{3}$$

In contrast, if the center of the main beam $LB_M$ deviates from the center line AX of the recording track TR, the difference output $TE_a$ takes a positive or negative value which is not equal to zero. Accordingly, when a control is conducted so that the value of the difference output $TE_a$ is equal to zero, the tracking servo control can be carried out. Further, by counting the points at which the value of $TE_a$ is crossing the zero points (zero cross points), the positional control of a light spot in the track jumping can be conducted. Generally, this difference output $TE_a$ is called a tracking error. In this case, the output $TE_a$ may have the relationship expressed as $TE_a=S_{s2}-S_{s1}$.

However, it should be noted that the above-mentioned on-track detection can be carried out by the 3-light-beam method only in connection with an optical disk exclusive for reproduction. In such an optical disk exclusive for reproduction, as shown in FIG. 13(A), since pit trains where information signals are stored are recorded at the portion of recording track TR indicated by white ground, a quantity of reflected light is smaller than that at the portion subjected to mirror finish processing indicated by the sand pattern in the FIG. Thus, $TE_a$ values which are not equal to zero are provided.

However, in the case of OMD of the Write Once Read Many (WORM) type or the Erasable Direct Read After Write (DRAW) type, at the non-recorded portion where no information is recorded, there is hardly difference between a quantity of reflected light at the portion of the track on which information is to be recorded (which particularly called a groove in the case of the OMD) and that at the portion except for the above. Accordingly, even if an attempt is made to provide a tracking error signal by the calculation expressed as the equation (1), $TE_a$ becomes equal to substantially zero. Thus, both in the on-track state where the center of the reading light spot exists on the center line of the recording track and in the off-track state where the center of the reading light spot deviates from the center line of the recording track, $TE_a$ becomes equal to zero. As a result, the on-track detection cannot be carried out.

PUSH PULL METHOD

Figure 14:
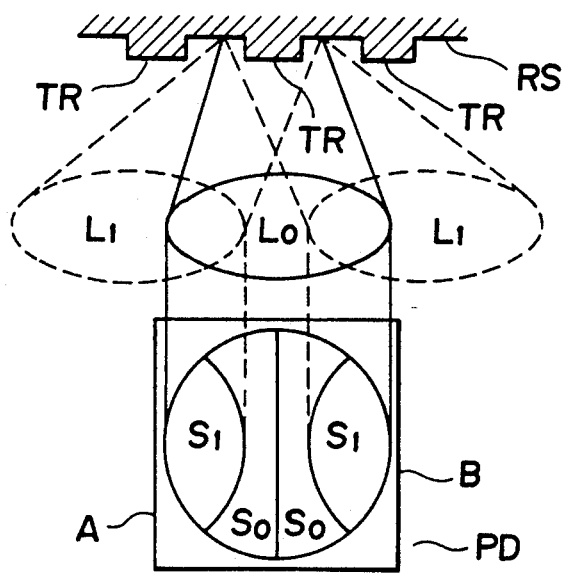
Figure 17:
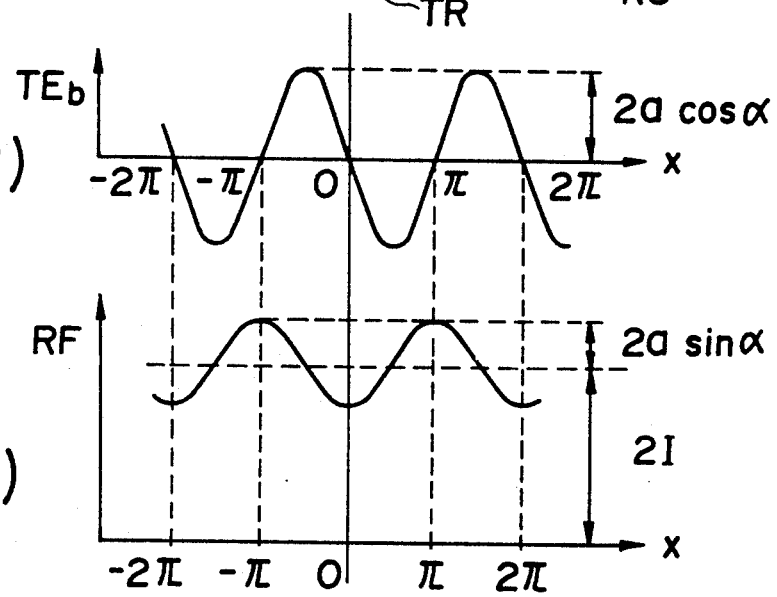

As the method permitting the on-track detection even in such a case, the push-pull method is known. The principle of the push-pull method will be described with reference to FIGS. 14, 15, 16 and 17. As shown in FIG. 14, in the push-pull method, a bisected photodetector PD is used. As shown in FIG. 14, by unevenness due to the recording tracks (grooves) TR on the recording surface RS of the optical disk and the groove portions except for the above, the zero-th order reflected light $L_0$ and $\pm 1$-st order reflected light $L_1$ are produced. When these rays of the reflected light are emitted onto the photodetector PD, the signal intensity distribution is as shown, i.e., a portion $S_0$ having relatively high eight intensity and a portion $S_1$ having a relatively low light intensity are produced. In this case, when the output terminals of the detector surfaces A and B are connected to the input terminal of the subtracter in the same manner as in the case of FIG. 13 to take a difference output, since the distributions of the portions $S_0$ and $S_1$ are symmetrical with respect to the detector surface divisional line in FIG. 14, the value of the difference output becomes equal to zero. The distributions of the 0-th order reflected light $L_0$ and the 1-st order reflected light $L_1$ are shown in a model form in FIGS. 15 (A), (B), (C) and (D). The change of the light intensity on the respective detector surfaces A and B in this case is shown in a manner in FIG. 16. In this figure, the x-direction is the direction perpendicular to the recording track (groove) wherein x=0 is set on the axis of a remarked recording track (groove). Namely, FIG. 16 is a view showing an output $S_A$ from the detector surface A and an output $S_B$ from the detector surface B in a radial direction of the disk in which the x-axis coincides with the radial direction of the disk. In this figure, $2\alpha$ represents a phase difference between $S_A$ and $S_B$. Further, $S_A$ and $S_B$ form sinusoidal curves which are the same in the amplitude and the wavelength, but only different in the phase wherein "a" represents an amplitude of the sinusoidal curve and "I" is an output value indicating the center of the amplitude of the sinusoidal curve. From the above, respective outputs $S_A$ and $S_B$ are expressed as follows:

$$S_A = I + a \sin(x-\alpha) \quad (4)$$

$$S_B = I - a \sin(x+\alpha) \quad (5),$$

If the different output $TE_b$ is expressed below:

$$TE_b = S_B - S_A, \quad (6)$$

$$TE_b = -2a \cdot \cos\alpha \cdot \sin x \quad (7).$$

Further, the information signal RF is expressed as follows:

$$RF = SA + SB \quad (8)$$
$$= 2I - 2 \cdot \sin\alpha \cdot \cos x \quad (9)$$

The tracking error signal $TE_b$ and the information signal RF are shown in FIGS. 17(A) and (C) with x-axis being coincident with the radial direction of the disk. As shown in FIG. 17(B), if an optical spot exists on the center line of the recording track (groove) TR, the tracking error signal $TE_b$ becomes equal to zero. Thus, this signal can be used for the on-track detection.

Figure 18:
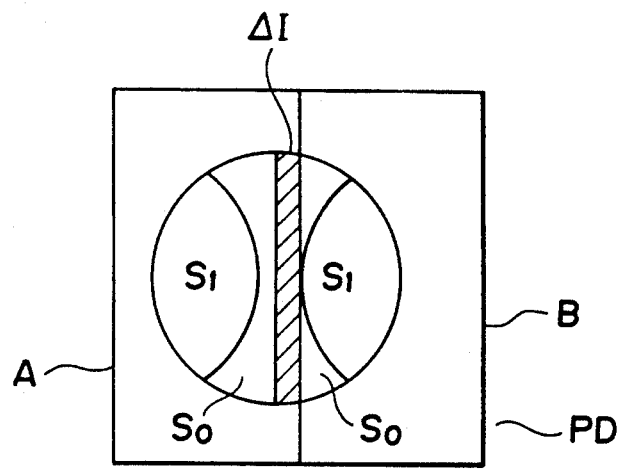
Figure 19:
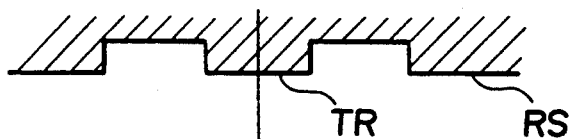
Figure 19:
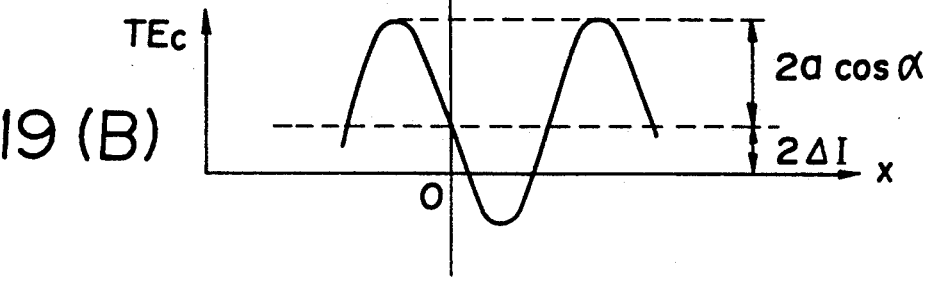

However, even in the case where the push-pull method is used, if the disk is inclined in a radial direction thereof, or there takes place any deviation in the optial axis of the lens of the optical system, an offset as indicated by $\Delta I$ in FIG. 18 takes place. When such an offset takes place, as shown in FIG. 19(B), even if the light spot exists on the axis of the recording track (groove), the tracking error signal serving as a difference output takes a value as indicated by the following equation:

$$TE_C = 2\Delta I \quad (10).$$

Namely, this signal dose not equal to zero.

3-PUSH-PULL METHOD

Figure 20:
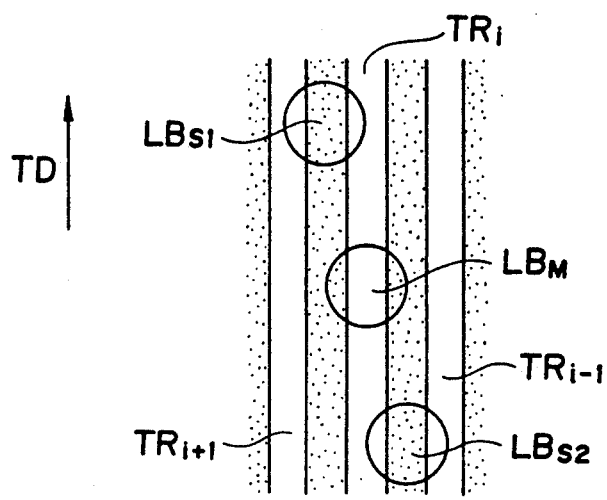

As the example of the on-track detection method attempting to solve the above mentioned offset, the method called the 3-push-pull method shown in FIGS. 20 and 21 is known.

Figure 21A:
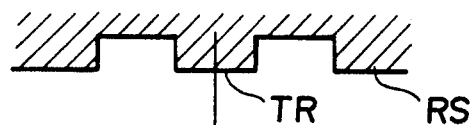
Figure 21B:
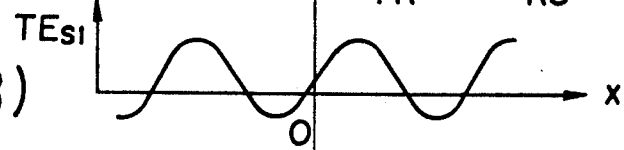
Figure 21C:
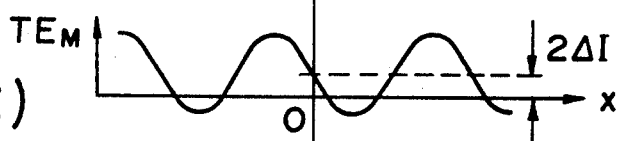
Figure 21D:
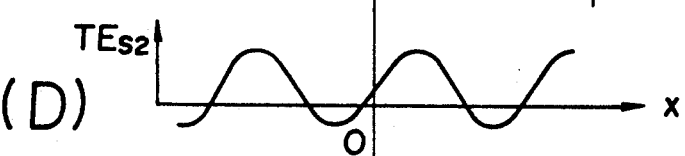

This system uses three light beam spots $LB_M$, $LB_{s1}$ and $LB_{s2}$. In this case, the preceding and succeeding light spot $LB_{s1}$ and $LB_{s2}$ are both emitted also onto recording tracks $TR_{i+1}$ and $TR_{i-1}$ adjacent to the recording track $TR_i$ on which the main light spot $LB_M$ exists. Namely, a portion of a light at the outer periphery of the preceding light spot is also emitted onto the recording track $TR_{i+1}$. Also in the case of the succeeding light spot light $LB_{s2}$, a portion of a light at the outer periphery thereof is also emitted onto the recording track $TR_{i-1}$. Then, reflected beams from the light spots are detected by three half-split photodetectors, and difference outputs are provided on the basis of the push-pull method, respectively. If the push-pull difference output of the main light spot $LB_M$, the push-pull difference output of the preceding light spot $LB_{s1}$ and the push-pull difference of the succeeding light spot $LB_{s2}$ are designated by $TE_M$, $TE_{s1}$ and $TE_{s2}$, respectively, outputs as shown in FIGS. 21(C), (B) and (D) are provided. Then, these outputs $TE_M$, $TE_{s1}$ and $TE_{s2}$ are used to perform the following calculation:

$$TE_d = TE_M - (K/2) \times (TE_{s1} + TE_{s2}) \quad (11).$$

Figure 21E:
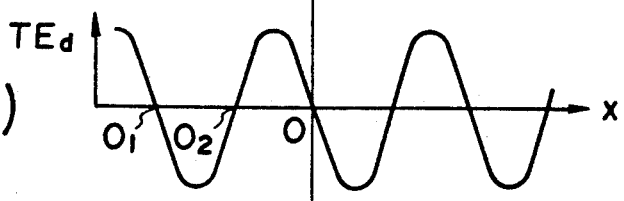

Thus, an output $TE_d$ is provided. In the above equation, K represents a ratio between a quantity of reflected light from the main light spot $LB_M$ and an intensity of reflected light from the preceding or succeeding light spot. In the case where the center of the main light spot $LB_M$ of the recording track TR, the output $TE_d$ becomes equal to zero as shown in FIG. 21(E). Accordingly, the tracking control can be carried out also at the non-recorded track portion without undergoing the influence of offset.

However, there was a problem that in the case of the so-called track jumping operation like a high speed search operation in CD, etc., the on-track detection cannot be carried out by the 3-push-pull method. Namely, in the case of the tracking control, as shown in FIG. 21(E), it is sufficient to efficient a control to allow the output $TE_d$ to be equal to zero in the vicinity of the origin of the x axis. On the other hand, in the case of the search operation, the number of zero cross points is counted to retrieve a target track. However, by information only about the zero cross points, discrimination between correct on-track position $0_1$ and wrong on-track position $0_2$ cannot be carried out as shown in FIG. 21(E).

Further, with the conventional 3-push-pull method, there was the problem also in the case of the tracking control at a time of writing (recording) information onto OMD, etc..

Figure 22A:
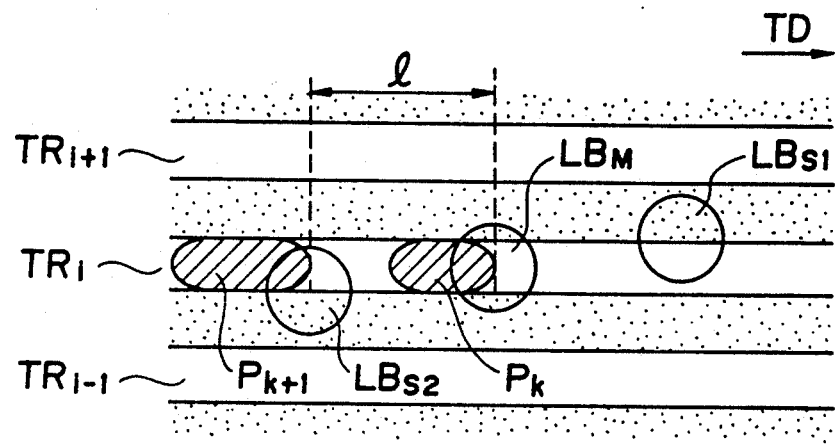
Figure 22B:
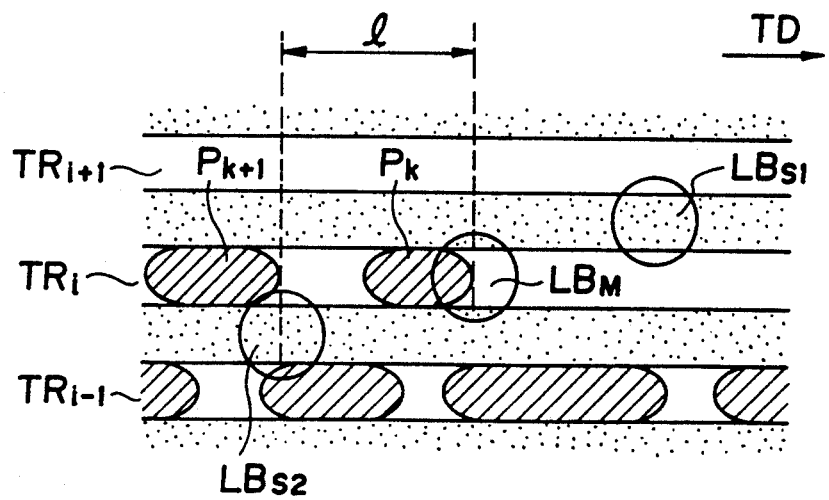

Namely, at the time of writing information, as shown in FIG. 22(A), pits $P_K$ are formed by the main light spot $LB_M$. On the pits, a quantity of reflected light of the light spot is small. Accordingly, when a portion of the succeeding light beam is positioned on the pits, the output of the photodetector is lowered. From this, even if the main light spot $LB_M$ is positioned on the axis of the track (groove) TR, the tracking error signal $TE_d$ seemingly does not becomes equal to zero. As a result, judgment might be erroneously made as if tracking deviation was produced. This similarity applies to the case where the succeeding light beam is positioned on the adjacent track as shown in FIG. 22(B).

PRINCIPLE OF THE INVENTION

The principle of the present invention to solve the above described problems will now be described with reference to FIG. 1.

Figure 1:
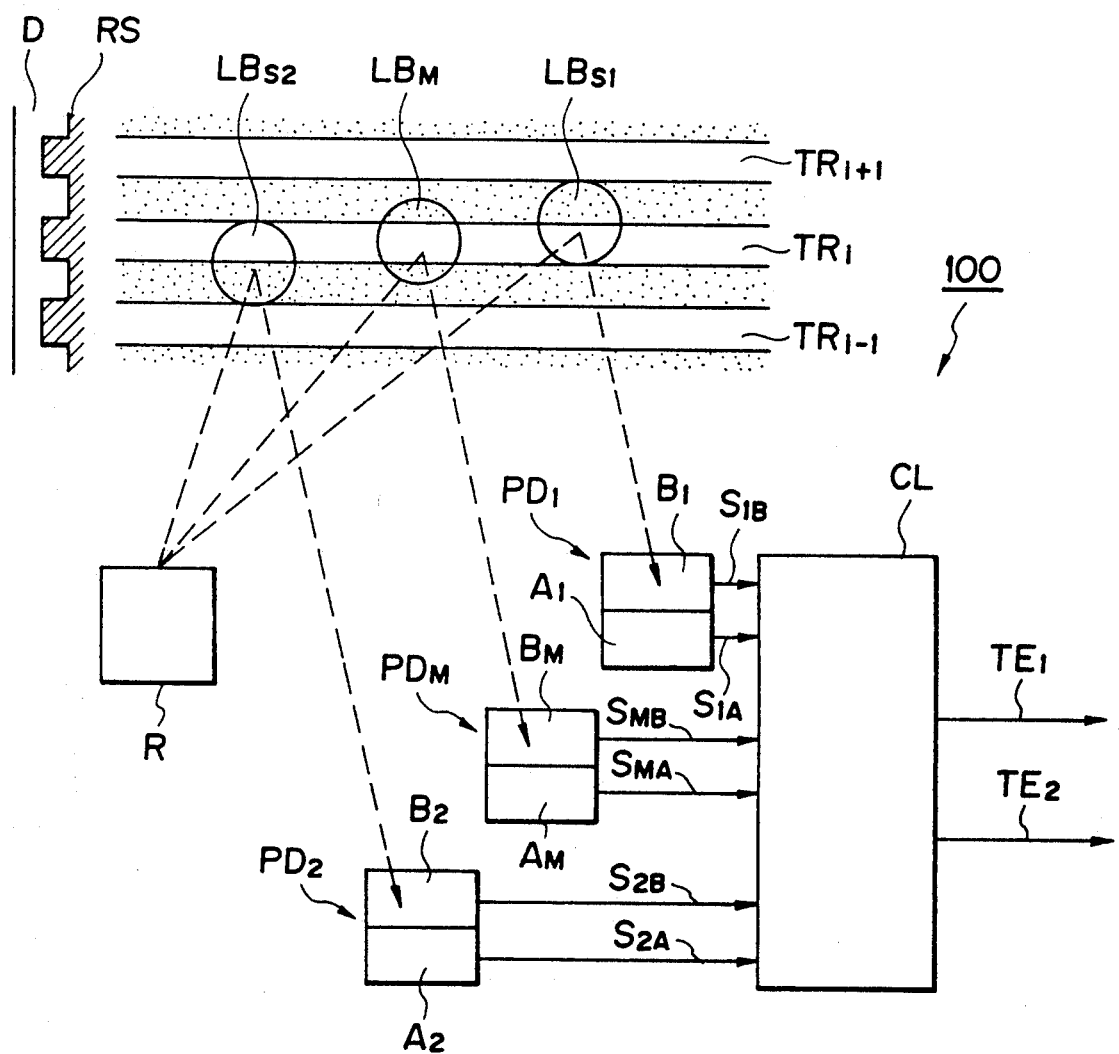
FIG. 1 is a view for explaining the principle of the present invention.

In FIG. 1, an apparatus for detecting a position of a light spot designated by a reference numeral 100 is directed to a light spot position detector in which a reflected light beam from the signal recording surface RS of an optical disk D is used to detect whether or not a light spot exists on the axis of a recording track. More particularly, this apparatus comprises: a light emitting unit R for emitting, onto the signal recording surface RS, a first light spot $LB_M$, a second light spot $LB_{s1}$ located at a position preceding to the first light spot $LB_M$ with a predetermined spacing in a direction of the center line of the recording track TR and with a another predetermined spacing from adjacent tracks in a direction perpendicular to the center line of the recording track so that no light is emitted onto the adjacent tracks, and a third light spot $LB_{s2}$ located at a position succeeding to the first light spot with a predetermined spacing in a direction of the recording track axis with respect to the first light spot $LB_M$ and with the other spacing on the opposite side to the second light spot $LB_{s1}$ in a direction perpendicular to the center line of the recording track; a first photodetection unit $PD_M$ including bisected detector surfaces $A_M$ and $B_M$, and for applying photoelectric conversion to a reflected light beam from the first light spot $LB_M$ to output two electric signals $S_{MA}$ and $S_{MB}$; a second photodetection unit $PD_1$ including bisected detector surfaces $A_1$ and $B_1$, and for applying photoelectric conversion to a reflected light beam from the second light spot $LB_{s1}$ to output two electric signals $S_{1A}$ and $S_{1B}$; and a third photodetection unit $PD_2$ including sected detector surfaces $A_2$ and $B_2$, and for applying photoelectric conversion to a reflected light beam from the third light spot $LB_{s2}$ to output two electric signals $S_{2A}$ and $S_{2B}$; and an operation unit CL for calculating a first difference output $TE_M$ which is a difference between outputs $S_{MA}$ and $S_{MB}$ from the respective detector surfaces $A_M$ and $B_M$ of the first photodetection unit $PD_M$, a second difference output $TE_{s1}$ which is a difference between outputs $S_{1A}$ and $S_{1B}$ from the detector surfaces $A_1$ and $B_1$ of the second photodetection unit $PD_1$, and a third difference output $TE_{s2}$ which is a difference between outputs $S_{1A}$ and $S_{2B}$ from the respective detector surfaces $A_2$ and $B_2$ of the third photodetection unit $PD_2$ to calculate a difference between real number times greater than a sum of the second and the third difference outputs $(K/2) \times (TE_{s1} + TE_{s2})$ and the first difference output $TE_M$ thus to output a first light spot position signal $TE_1$, and to calculate a difference between the second and the third difference outputs $TE_{s1}$ and $TE_{s2}$ thus to output a second light spot position signal $TE_2$.

Figure 5A:
Figure 5B:
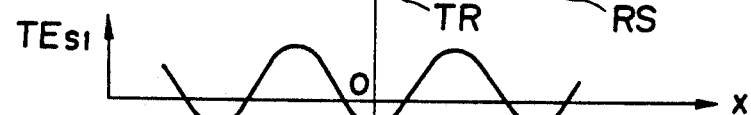

In accordance with the light spot position detector thus constructed, the second light spot $LB_{s1}$ is irradiated at a position where no light is emitted onto recording tracks $TR_{i+1}$ and $TR_{i-1}$ adjacent in a direction perpendicular to the center line of the recording track $TR_i$, and the third light spot $LB_{s2}$ is irradiated with the same spacing as in the case of the second light spot $LB_{S1}$ on the opposite side to the second light spot $LB_{s1}$ with respect to the center line of or the recording track $TR_i$. Thus, the difference output (push-pull output) $TE_{s1}$ of the second light spot and the difference output (push-pull output) $TE_{s2}$ of the third light spot are not the same in phase as in the case of the conventional form shown in FIGS. 21(B) and (D), but are out of phase, e.g., as shown in FIGS. 5(B) and (D). For this reason, if the first light spot position signal $TE_1$ is determined by the following equation:

$$TE_1 = TE_M - (K/2) \times (TE_{s1} + TE_{s2}) \quad (12).$$

(In the above equation, $TE_M$ represents a first difference output and K/2 represents a predetermined real number), and if the second light spot position signal $TE_2$ is determined by calculation by the following equation:

$$TE_2 = TE_{s1} - TE_{s2} \quad (13)$$

it can be discriminated that only when $TE_1$ is equal to zero and $TE_2$ takes a predetermined value, there results the on-track state. Since there does not result the on-track state when $TE_2$ takes other values even if $TE_1$ is equal to zero, discrimination is easily carried out. In the case of the conventional 3-push-pull method, since the phases of $TE_{s1}$ and $TE_{s2}$ are equal to each other, $TE_2$ is equal to zero at all times. Accordingly, the on-track state could not be detected only by the fact that $TE_1$ is equal to zero. On the contrary, in accordance with the above form, discrimination can be easily conducted. Here, K represents a ratio between a push-pull difference output from the main light spot and a mean value of push-pull outputs from the preceding and succeeding light spots in the on-track state. Namely, in the on-track state, K is represented by $2 \times TE_M/(TE_{s1} + TE_{s2})$.

Preferred embodiments of the present invention will now be described with reference to the attached drawings.

FIRST EMBODIMENT

Figure 2:
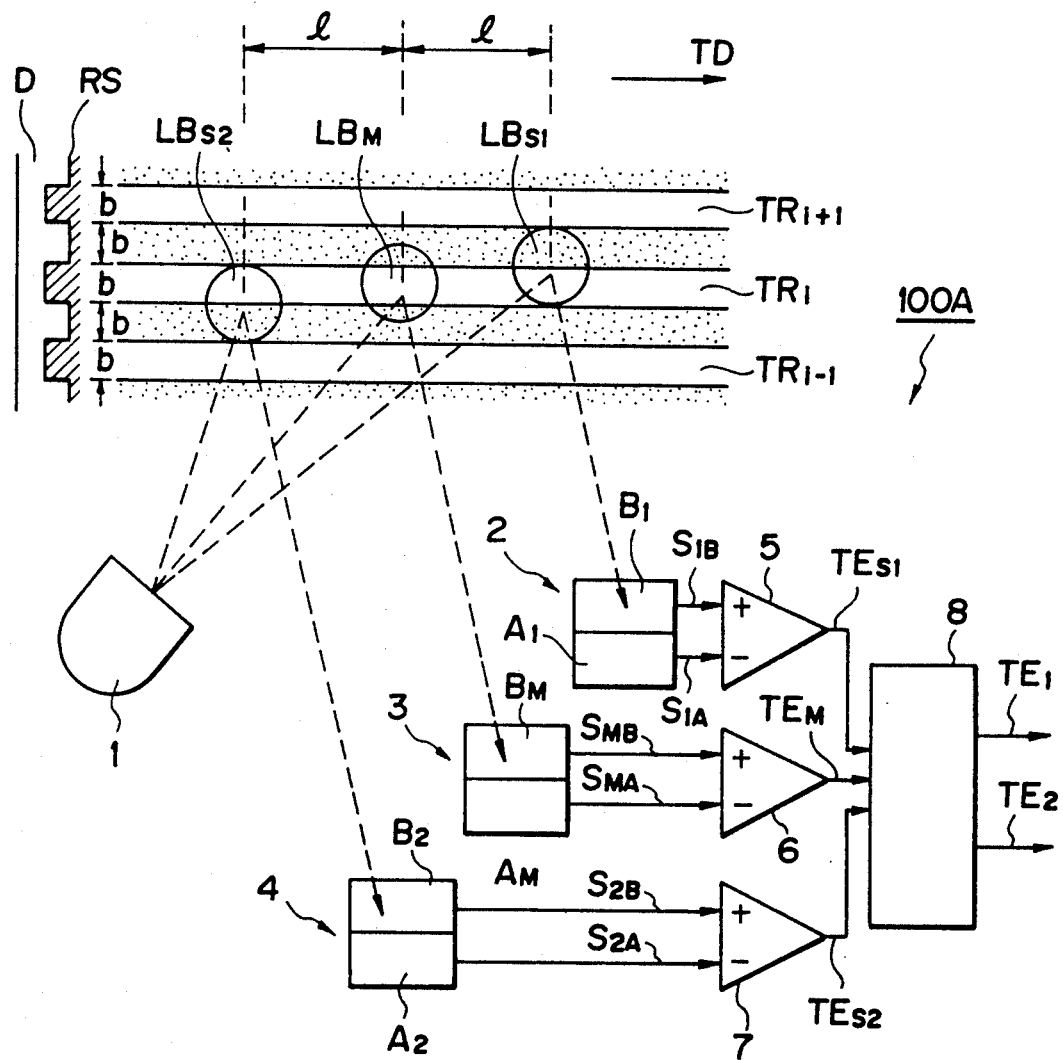
FIG. 2 is view showing the configuration of a first embodiment according to the present invention.

FIG. 2 shows the configuration of a first embodiment.

An apparatus for detecting a position of a light spot designated by a reference numeral 100A comprises a laser light source 1 serving as an emitting means, a bisected photodetector 3 serving as a first photodetection means, a bisected photodetector 2 serving as a second photodetection means, a bisected photodetector 4 serving as a third photodetection means, subtracters 5, 6 and 7, and an operation circuit 8. Here, the subtracters 5, 6 and 7 and the operation circuit 8 constitute an operation means.

The laser light source 1 is comprised of optical parts such as a laser diode, a lens, or a half-mirror (not shown), etc. and emits a light spot as shown onto the recording track $TR_i$ on the signal recording surface of OMD. A main light spot LBM serving as a first light spot is emitted onto the center line of the recording track (groove) $TR_i$. The preceding light spot $LB_{s1}$ serving as the second light spot is emitted at a position preceding by a predetermined interval or a first predetermined spacing l in a direction of the recording track center line from the main light spot $LB_M$ and spaced by a distance or a second predetermined spacing b/2 on the recording track $TR_{i+1}$ side in a direction perpendicular to the recording track center line. In this case, the respective recording track widths and the widths of the portions outside the recording tracks are equal to each other. Each width is b. Further, the diameter of the light spot is designated by 2b. Accordingly, as shown in FIG. 2, there is employed an arrangement such that the outer peripheral portion of a light of the preceding light spot $LB_{s1}$ is not emitted onto the adjacent recording track $TR_{i+1}$.

Further, the succeeding light spot $LB_{s2}$ serving as the third light spot is irradiated at a position succeeding by an interval or spacing l in a direction of the recording track center line from the main light spot $LB_M$, and spaced by a fixed distance or a second predetermined spacing b/2 on the recording track $TR_{i-1}$ side in a direction perpendicular to the recording track center line. An arrangement is employed such that the outer peripheral portion of a light of the succeeding light spot is not also emitted onto the adjacent recording track $TR_{i-1}$.

The bisected photodetector 3 includes detector surfaces $A_M$ and $B_M$ in such a manner that the direction of the divisional line of the detector surface is in parallel to the direction of the recording track center line. The output terminal of the detector surface $A_M$ is connected to the negative side input terminal of the subtracter 6, and the output terminal of the detector surface $B_M$ is connected to the positive side input terminal of the subtracter 6.

The bisected photodetector 2 includes detector surfaces $A_1$ and $B_1$ in such a manner that the direction of the divisional line of the detector surface is in parallel to the direction of the recording track center line. The output terminal of the detector surface $A_1$ is connected to the negative input terminal of the subtracter 5, and the output terminal of the detector surface $B_1$ is connected to the positive side input terminal of the subtracter 5.

The bisected photodetector 4 is of a structure including detector surfaces $A_2$ and $B_2$ and such that the direction of the divisional line of the detector surface is in parallel to the direction of the recording track center line. The output terminal of the detector surface $A_2$ is connected to the negative side input terminal of the subtracter 7 and the output terminal of the detector surface $B_2$ is connected to the positive input side terminal of the subtracter 7.

The outputs of these subtracters 5, 6 and 7 are connected to the input terminal of the operation circuit 8.

The operation of the apparatus for detecting position of a light spot designated by the reference numeral 100A will now be described with reference to FIGS. 2, 3, 4 and 5.

A reflected light from the main light spot $LB_M$ is detected by the bisected photodetector 3, and is subjected to photoelectric conversion. As a result, an output $S_{MA}$ is outputted from the detector surface $A_M$ to the subtracter 6, and an output $S_{MB}$ is outputted from the detector surface $B_M$ to the subtracter 6. Thus, the subtracter performs calculation expressed as below:

$$TE_M = S_{MB} - S_{MA} \quad (15)$$

Figure 5C:
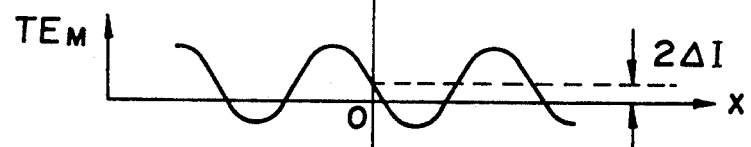

$TE_M$ corresponds to a first difference output. FIG. 5(C) shows a graphical representation of a curve of the difference output (push-pull output) $TE_M$ with the radial direction of the disk axis being coincident with the x-axis. This curve is a sinusoidal curve. In this case, an offset $2\Delta l$ is produced.

A reflected light from the preceding light spot $LB_{s1}$ is detected by the bisected photodetector 2, and is subjected to photoelectric conversion. As a result, an output $S_{1A}$ is outputted from the detector surface $A_1$ to the subtracter 5, and an output $S_{1B}$ is outputted from the detector surface $B_1$ to the subtracter 5. Thus, the subtracter 5 performs a calculation expressed below:

$$TE_{s1} = S_{1B} - S_{1A} \quad (16)$$

$TE_{s1}$ corresponds to a second difference output. FIG. 5(B) is a graphical representation of a curve of the difference output (push-pull output) $TE_{s1}$ with the radial direction being coincident with the x-axis. This curve is a sinusoidal curve different from $TE_M$ only in the phase.

A reflected light from the succeeding light spot $LB_{s2}$ is detected by the bisected photodetector 4, and is subjected to photoelectric conversion. As a result, an output $S_{2A}$ is outputted from the detector surface $A_2$ to the subtracter 7, and an output $S_{2B}$ is outputted from the detector surface $B_2$ to the subtracter 7. Thus, the subtracter 7 performs a calculation by the following equation:

$$TE_{s2} = S_{2B} - S_{2A} \quad (17)$$

Figure 5D:
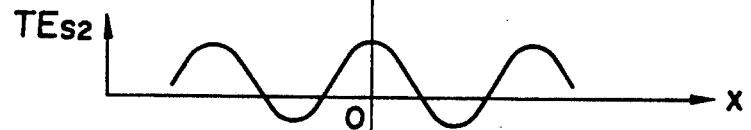

$TE_{s2}$ corresponds to a third difference output. FIG. 5(D) is a graphical representation of a curve of this difference output (push-pull output) $TE_{s2}$ with radial direction of the disk being coincident with the x-axis. This curve is a sinusoidal curve different from $TE_M$ only in the phase. As seen from FIGS. 5(B) and (D), when the light spots $LB_M$, $LB_{s1}$ and $LB_{s2}$ are irradiated as in this embodiment, there is produced a phase difference of 180 degrees between the difference outputs $TE_{s1}$ and $TE_{s2}$.

Then, in the operation circuit 8, the calculation described below is performed:

$$TE_1 = TE_M - (K/2) \times (TE_{s1} + TE_{s2}) \quad (18)$$

$$TE_2 = TE_{s1} - TE_{s2} \quad (19).$$

Figure 5E:
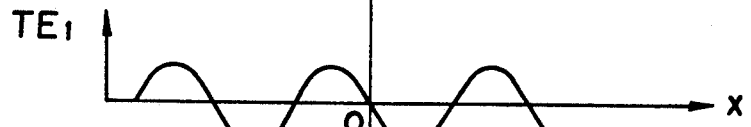
Figure 5F:
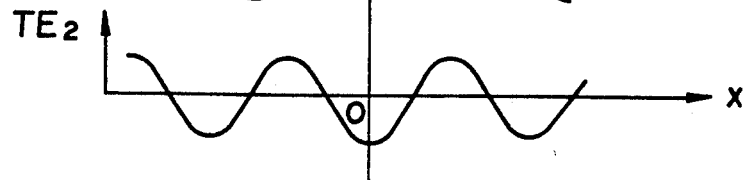

Thus, $TE_1$ is outputted as a first light spot position signal, and $TE_2$ is outputted as a second light spot position signal. In the above equation, K represents a ratio between a push-pull difference output from the main light spot $LB_M$ and a mean value of push-pull difference outputs from the preceding and succeeding light spots in the on-track state. Namely, in the on-track state, K is represented by the relationship expressed as $2 \times TE_M/(TE_{s1} + TE_{s2})$. The waveforms of $TE_1$ and $TE_2$ are as shown in FIGS. 5(E) and (F). As seen from these figures, in the signal $TE_1$, the offset $2\Delta I$ is eliminated. Further, since there is a phase difference of 180 degrees between $TE_{s1}$ and $TE_{s2}$, $TE_2$ does not become equal to zero. When the main light spot $LB_M$ is in the on-track state, $TE_2$ indicates a negative maximal value. From this fact, it is seen that an approach is employed to search the case where the relationship expressed as $TE_1 = 0$ and $TE_2 = N$ ($N < 0$), thereby making it possible to carry out control of the track jumping operation.

Figure 3:
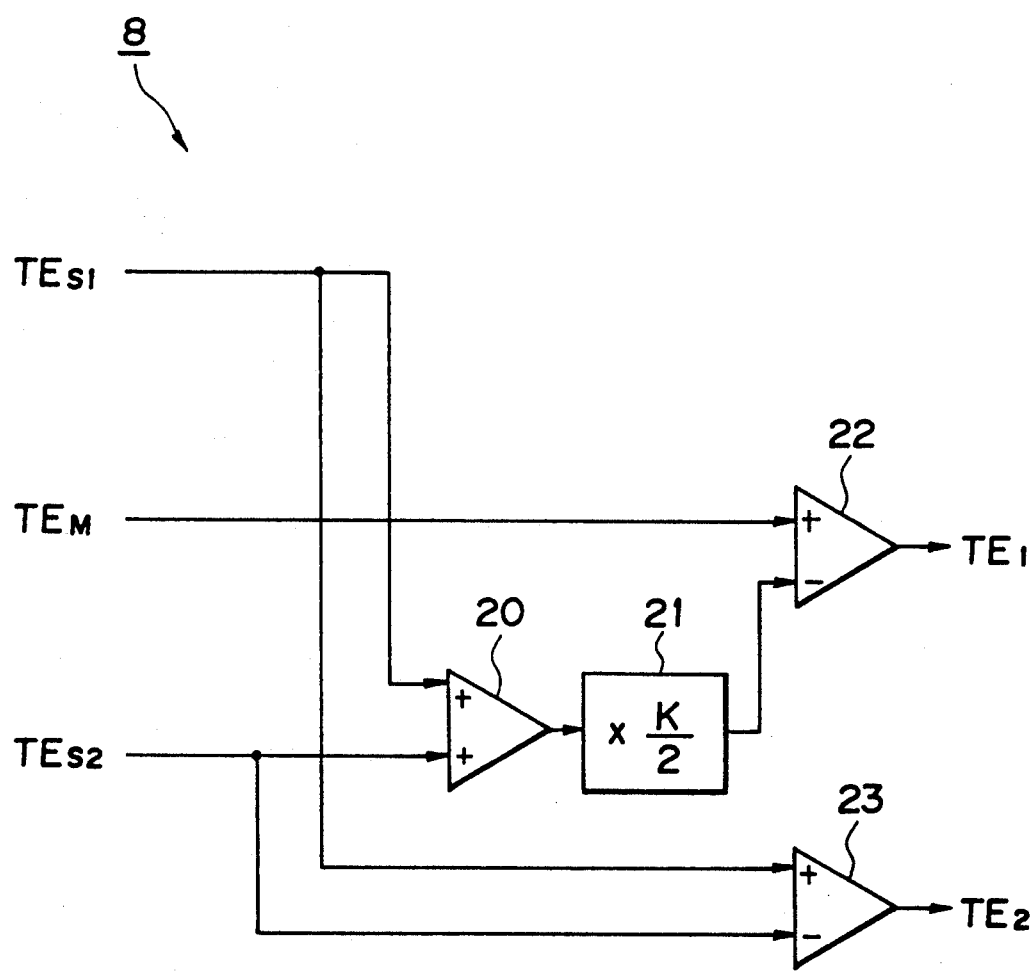
FIG. 3 is a diagram showing a detailed configuration of the operation circuit in FIG. 2.
Figure 4:
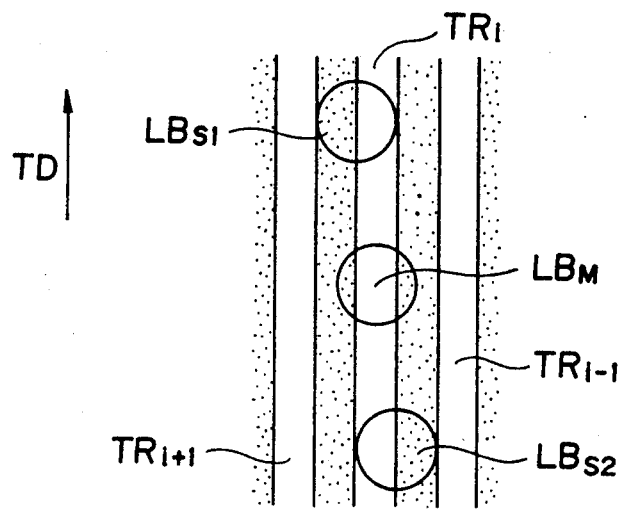
FIG. 4 is a view showing the relationship between the light spot and the recording track in FIG. 2, FIGS. 5 (A-F) is a diagram showing the operation of the first embodiment according to the present invention.

The detailed configuration of the operation circuit 8 for performing the calculation expressed by the above equations (18) and (19) is shown in FIG. 3. As shown in this figure, this operation circuit 8 includes an adder 20, a multiplier 21, and substracters 22 and 23 connected as shown, and has a structure such that respective push-pull difference outputs $TE_M$, $TE_{s1}$ and $TE_{s2}$ are inputted as shown. The value of multiplier factor K/2 multiplied in the multiplier 21 is set to a quotient (real number) which is gotten when $TE_M$ is divided by a mean value of $TE_{s1}$ and $TE_{s2}$ in the on-track state as described above.

SECOND EMBODIMENT

Figure 8:
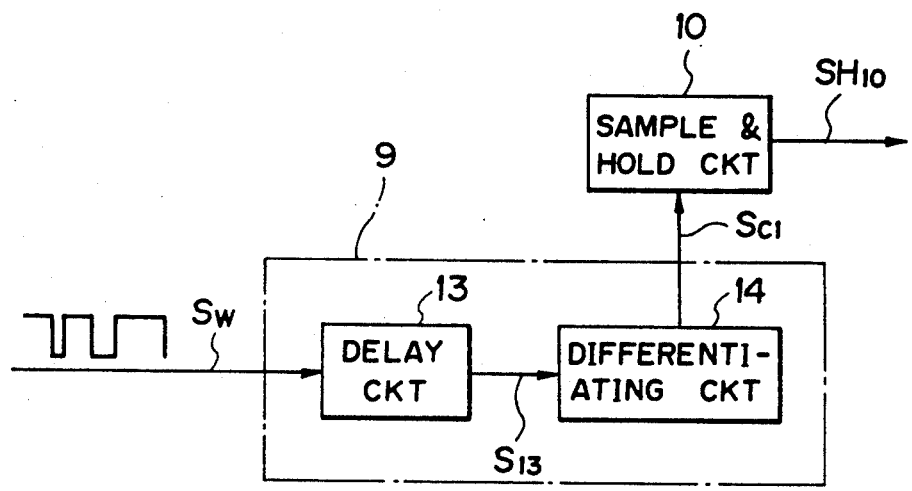
FIG. 8 is a block diagram showing the detailed configuration of the timing control circuit in FIGS. 6 and 7, FIGS. 9(A-C) is a diagram showing the operation of the timing control circuit in FIGS. 6 and 7.

A second embodiment will now be described with reference to FIGS. 6, 8 and 9.

Figure 6:
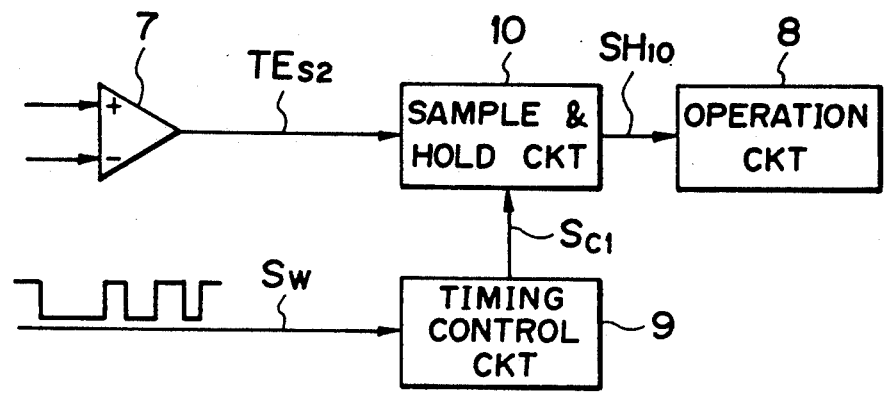
FIG. 6 is a block diagram showing the configuration of a second embodiment according to the present invention.

The configuration of the second embodiment is shown in FIG. 6.

The second embodiment has the configuration that, in the light spot position detecting apparatus 100A of FIG. 2, a sample-and-hold circuit 10 is provided between the subtracter 7 and the operation circuit 8, and that a timing control circuit 9 is connected to the sample-and-hold circuit 10.

A EFM (eight to fourteen modulation) signal SW for writing information is inputted to the timing control circuit 9. This write EFM signal $S_W$ is obtained from an information signal RF read by the main light spot $LB_M$. The timing control circuit 9 detects the portion of the non-recording state, where no information is recorded, of the write EFM signal $S_W$ to output, to the sample-and-hold circuit 10, a control signal $S_{C1}$ for sampling and holding an input after the time expressed below has passed from the time point when the signal $S_W$ is brought into the non-recording state:

$$\tau = l/v \quad (20).$$

By constructing the light spot position detecting apparatus in this way, it is possible to carry out the on-track detection without hindrance even at the time of recording information onto OMD.

In the above equation, l is a distance between the center of the main light spot $LB_M$ and that of the succeeding light spot $LB_{s2}$, and v is a speed of the light spot moving on the recording track. The sample-and-hold circuit 10 samples and holds, by a control signal $S_{C1}$, a difference output $TE_{s2}$ inputted from the subtracter 7 to output it as an output $SH_{10}$ to the operation circuit 8. The output SH10 corresponds to a fourth difference output. The operation circuit 8 uses the output $SH_{10}$ in place of the difference output $TE_{s2}$ to perform the calculation expressed by the above equations (18) and (19), thus to output outputs $TE_1$ and $TE_2$. FIG. 8 shows the further detailed configuration of the timing control circuit 9. Namely, the timing control circuit 9 is of a structure including a delay circuit 13 and a differentiating circuit 14 connected in series. The delay circuit 13 receives a write EFM signal $S_W$ to output a delay signal $S_{13}$ to the differentiating circuit 14. The differentiation circuit 14 receives the delay signal $S_{13}$ to perform differentiating operation to output a differentiated signal as a control signal $S_{C1}$ to the sample-and-hold circuit 10.

Figure 9A:
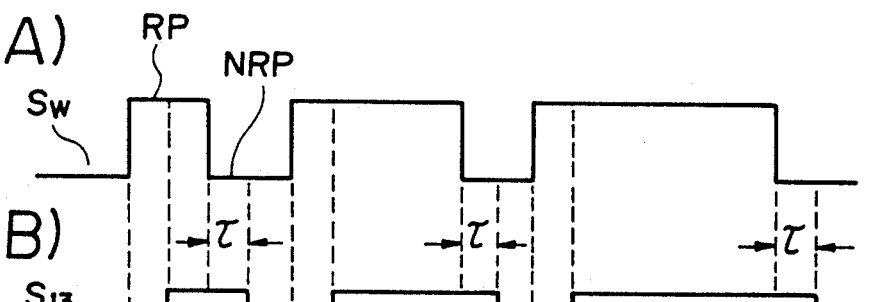
Figure 9B:
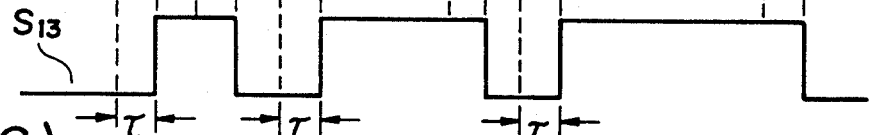
Figure 9C:
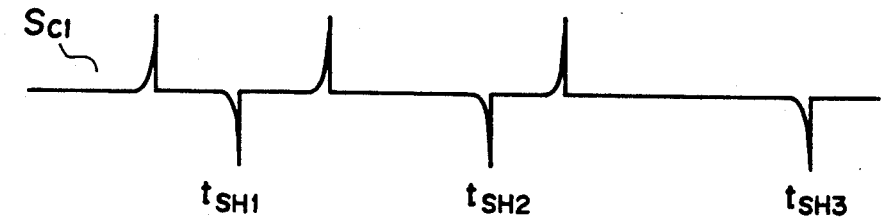

The timing charts of these signals $S_W$, $S_{13}$ and $S_{C1}$ are shown in FIG. 9. Namely, the delay circuit 13 delays the signal $S_W$ by $\tau$ so that the signal $S_{13}$ is placed in the non-recording state after the time $\tau$ ($=l/v$) has passed from the time point when the write EFM signal $S_W$ is placed in the non-recording state, thus to generate a signal $S_{13}$. The differentiating circuit 14 differentiates this delay signal $S_{13}$ to generate a control signal $S_{C1}$. This control signal is a pulse signal as shown in FIG. 9(C). In response to respective pulse falling edges $t_{SH1}$, $t_{SH2}$ and $t_{SH3}$ of the control signal $S_{C1}$ generated when it shifts from the recording state corresponding to recording portions RP to the non-recording state corresponding to non-recording portion NPR, the sample-and-hold circuit 10 carries out sample-and-hold operation.

Third Embodiment

Figure 7:
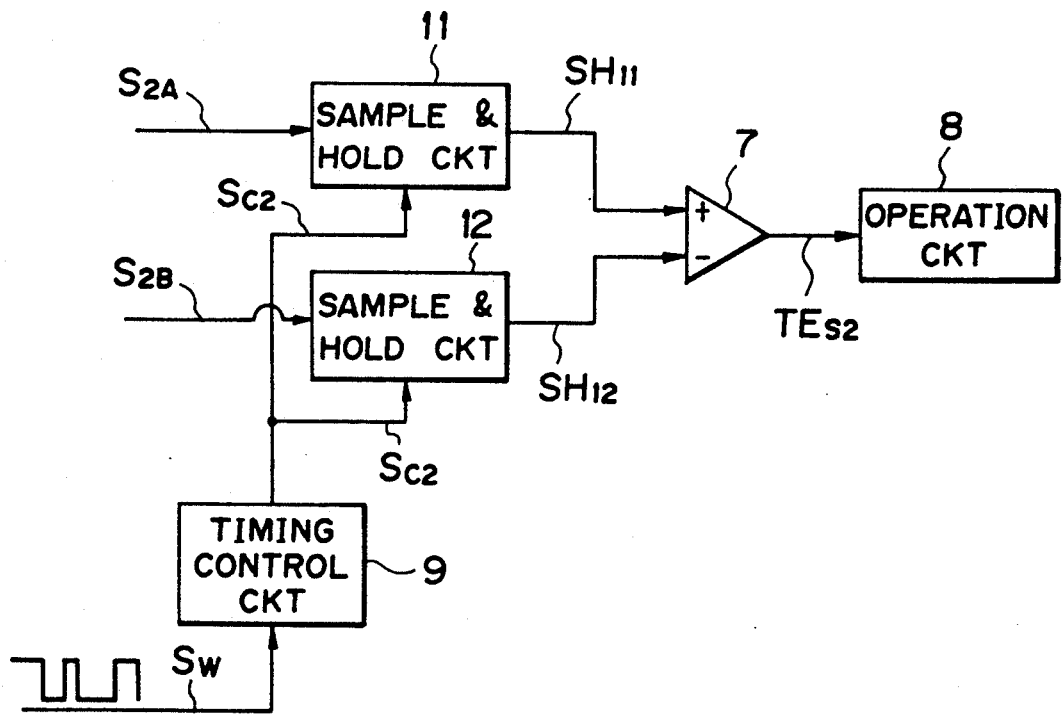
FIG. 7 is a block diagram showing the configuration of a third embodiment according to the present invention.

In the second embodiment, processing is carried out after the difference output $TE_{s2}$ from the substracter 7 is generated and, however, there may be employed an arrangement of a third embodiment shown in FIG. 7 such that processing is carried out at the stage of light outputs $S_{2A}$ and $S_{2B}$ from the photodetector 4. In this case, two sample-and-hold circuits 11 and 12 are provided between the bisected photodetector 4 and the subtracter 7, and a timing control circuit 9 for outputting a control signal $S_{C2}$ to the sample hold circuits 11 and 12. The operating timing is as shown in FIG. 9.

Fourth Embodiment

Figure 10:
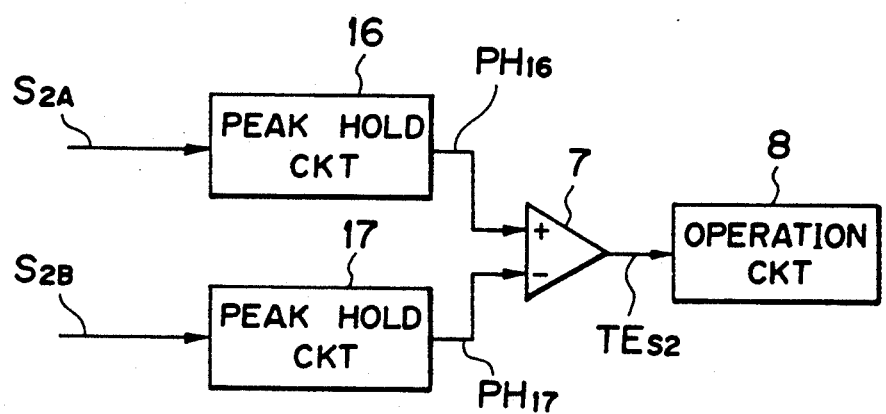
FIG. 10 is a block diagram showing the configuration of a fourth embodiment according to the present invention, FIGS. 11(A-B) is a view showing the operation of the fourth embodiment according to the present invention.
Figure 11A:
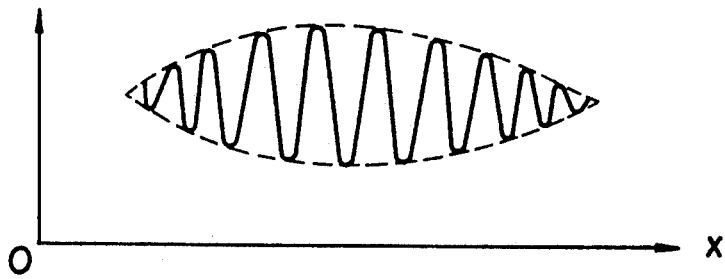

A fourth embodiment will now be described with reference to FIGS. 2, 10 and 11.

Figure 11B:
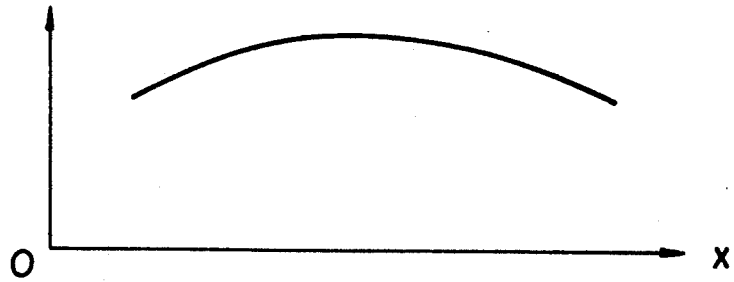

As previously described, at the time of recording information onto OMD, if an approach is employed to apply photoelectric conversion to a reflected light by using the bisected photodetector 4 shown in FIG. 2 to provide an output thus obtained, that output has a waveform such that a quantity of light is increased at the non-recording portion and a quantity of light is decreased at the recording portion. To solve this, there is employed in this embodiment an arrangement as shown in FIG. 10. Namely, two peak hold circuits 16 and 17 are provided between the bisected photodetector 4 and the subtracter 7. By the light spot position detecting apparatus in this way, outputs $S_{2A}$ and $S_{2B}$ are modified as shown in FIG. 11(B). For this reason, the operation circuit 8 can calculate the outputs $TE_1$ and $TE_2$ without hindrance.

It is to be noted that it is a matter of course that if a peak hold circuit is provided between the output side of the subtracter 7 and the operation circuit 8 in place of the peak hold circuits 16 and 17 in the above mentioned fourth embodiment, advantages similar to the above are provided.

FIFTH EMBODIMENT

A fifth embodiment will now be described with reference to FIG. 12.

In this embodiment, as shown in FIG. 12, a low pass filter 18 for eliminating the RF (Radio Frequency) signal component included in $TE_{s2}$ to extract only the low frequency component is arranged at the succeeding stage of the subtracter 7 in the embodiment of FIG. 2.

The extracted low frequency component $LF_{18}$ is a mean value of $TE_{s2}$. For this reason, the level is lowered to some extent when compared to the peak hold value which has been described in the fourth embodiment. To improve this, an amplifier 19 for compensating a value corresponding to a lowered level is provided immediately after the low pass filter 18 to deliver an output $AP_{19}$ from the amplifier 19 to the operation circuit 8. Here, the output $AP_{19}$ from the amplifier 19 corresponds to the fourth difference output.

It is to be noted that it is a matter of course that if low pass filters and amplifiers are provided in paths for light outputs $S_{2A}$ and $S_{2B}$ between the input side of the subtracter 7 and the bisected photodetector 4, advantages similar to the above can be provided.

It is to be noted that the above described embodiments should not be comprehended only in connection with their explanation.

The second to the fifth embodiments can be carried out in connection with not only the apparatus for detecting a light spot position of FIG. 2 of the invention, but also an apparatus for detecting a light spot position using the 3-push-pull method in the conventional form.

Further, while the subtracters 5, 6 and 7 are operative in a manner to subtract the B side output from the A side output in the above described embodiments, they may be operative in a manner to subtract the B side output from the A side output.

The present invention may be also implemented as follows. Namely, in the light spot position detecting apparatus 100A of the second to the fifth embodiments, an approach may be employed to take, by using an adder, a sum output of outputs $S_{1A}$ and $S_{1B}$ from the respective detector surfaces $A_1$ and $B_1$ of the photodetector 2 to obtain a sum output $SUM_1$. Then, a sum output of outputs $S_{2A}$ and $S_{2B}$ from the respective detector surfaces $A_2$ and $B_2$ of the photodetector 4 is calculated by using an adder to obtain a sum output $SUM_2$, and a difference $(SUM_1-SUM_2)$ or $(SUM_2-SUM_1)$ between the sum output $SUM_1$ and the sum output $SUM_2$ is calculated. Thus, this apparatus can be easily used as a light spot position detecting apparatus based on the ordinary 3-light-beam method. To use the apparatus in a manner stated above, it is sufficient to add IC (Integrated Circuit) for the operation circuit, etc. to the apparatus. Thus, it is possible to easily cope with such a modification. By employing such a configuration, even in the case of ordinary optical disks exclusive for reproduction such as compact disks or video disks, etc., the compatibility can be maintained by switching of the circuit. Thus, it is possible to easily cope with such a modification by a more simple circuit configuration.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meanings and range of equivalency of the claims are therefore intended to be embraced therein.

What is claimed is:

1. An apparatus for detecting a position of a light spot on an optical disk, in which a reflected light beam from a signal recording surface of the optical disk is used to detect whether or not the light spot exists on a center line of a recording track axis of the optical disk, said apparatus comprising:

light emitting means for emitting, onto said signal recording surface, a first light spot, a second light spot located at a position preceding to the first light spot with a first predetermined spacing in a direction of the recording track axis and with a second predetermined spacing in a direction perpendicular to the center line of the recording track, and a third light spot located at a position succeeding to the first light spot with the same spacing as the first predetermined spacing in a direction of the center line of the recording track and with the same spacing as the second predetermined spacing on the opposite side to the second light spot in a direction perpendicular to the center line of the recording track axis;

first photodetection means including bisected detector surfaces, and for applying photoelectric conversion to a reflected light beam from the first light spot to output two electric signals;

second photodetection means including bisected detector surfaces, and for applying photoelectric conversion to a reflected light beam from the second light spot to output two electric signals;

third photodetection means including bisected detector surfaces and for applying photoelectric conversion to a reflected light beam from the third spot to output two electric signals; and operation means for calculating a first difference output indicative of a difference between the two electric signals from respective detector surfaces of said first photodetection means, a second difference output indicative of a difference between the two electric signals from respective detector surfaces of said second photodetection means, a third difference output indicative of a difference between the two electric signals from respective detector surfaces of the third photodetection means, and a fourth difference output including a low frequency band component of the third difference output obtained by eliminating any radio frequency signal component of the third difference output, said operation means calculating a sum of the second and the fourth difference outputs, calculating a product of said sum and a predetermined real number, calculating a difference between the product and the first difference output to output a first light spot position signal, and calculating a difference between the second and the fourth difference outputs to output a second light spot position signal.

2. An apparatus for detecting a position of a light spot on an optical disk as set forth in claim 1, wherein in the case where a position of said first light spot on the recording track is in a non-recording state, after the time required until the light spot moves by a distance between the center of the first light spot and that of the third light spot has passed from the above time point when the position of the light spot is placed in the non-recording state, said operation means samples and holds the third difference output to generate the fourth difference output, thus to calculate the first and the second light spot position signals.

3. An apparatus for detecting a position of a light spot on an optical disk as set forth in claim 1, wherein said operation means holds a peak level of the third difference output to generate the fourth difference output, thus to calculate the first and the second light spot position signals.

4. An apparatus for detecting a position of a light spot on an optical disk as set forth in claim 1, wherein said operation means amplifies the low frequency band component of the third difference output at a predetermined amplification factor to generate the fourth difference output, thus to calculate the first and the second light spot position signals.

5. An apparatus for detecting a position of a light spot on an optical disk as set forth in claim 1, wherein said operation means comprises a low pass filter means for eliminating the radio frequency signal component of the third difference output to generate the fourth difference output.

* * * * *